（12）United States Patent
Spritzer et al.

(10) Patent No.: US 11,858,652 B2
(45) Date of Patent: Jan. 2, 2024

(54) MISHAP LOGGING SYSTEM

(71) Applicant: Raytheon Company, Waltham, MA (US)

(72) Inventors: Zachary W. Spritzer, Dulles, VA (US); Vincent J. Sacro, Dulles, VA (US); Timothy P. Duston, Sterling, VA (US)

(73) Assignee: Raytheon Company, Waltham, MA (US)

( * ) Notice: Subject to any disclaimer, the term of this patent is extended or adjusted under 35 U.S.C. 154(b) by 352 days.

(21) Appl. No.: 17/212,160

(22) Filed: Mar. 25, 2021

(65) Prior Publication Data

US 2023/0202673 A1    Jun. 29, 2023

(51) Int. Cl.
*B64D 45/00* (2006.01)
*G07C 5/08* (2006.01)

(52) U.S. Cl.
CPC ............. *B64D 45/00* (2013.01); *G07C 5/085* (2013.01); *B64D 2045/0065* (2013.01)

(58) Field of Classification Search
CPC . B64D 45/00; B64D 2045/0065; G07C 5/085
See application file for complete search history.

(56) References Cited

U.S. PATENT DOCUMENTS

2017/0359388 A1* 12/2017 Finchelstein ....... H04L 63/1441
2019/0039729 A1*  2/2019 Alves ................... G08G 5/0013

\* cited by examiner

*Primary Examiner* — James J Lee
*Assistant Examiner* — Jonathan E Reinert
(74) *Attorney, Agent, or Firm* — Renner, Otto, Boisselle & Sklar

(57) ABSTRACT

A system and method is provided that captures command and control string data during an unmanned vehicle operation. The control string includes user inputs (e.g., mouse inputs, keyboard inputs, etc.) and display outputs (i.e., data displaying to the user via displays). The control string data is captured and stored during the sortie (i.e., a flight) and the control string is preserved (also referred to as impounded) when a mishap occurred during the sortie.

20 Claims, 3 Drawing Sheets

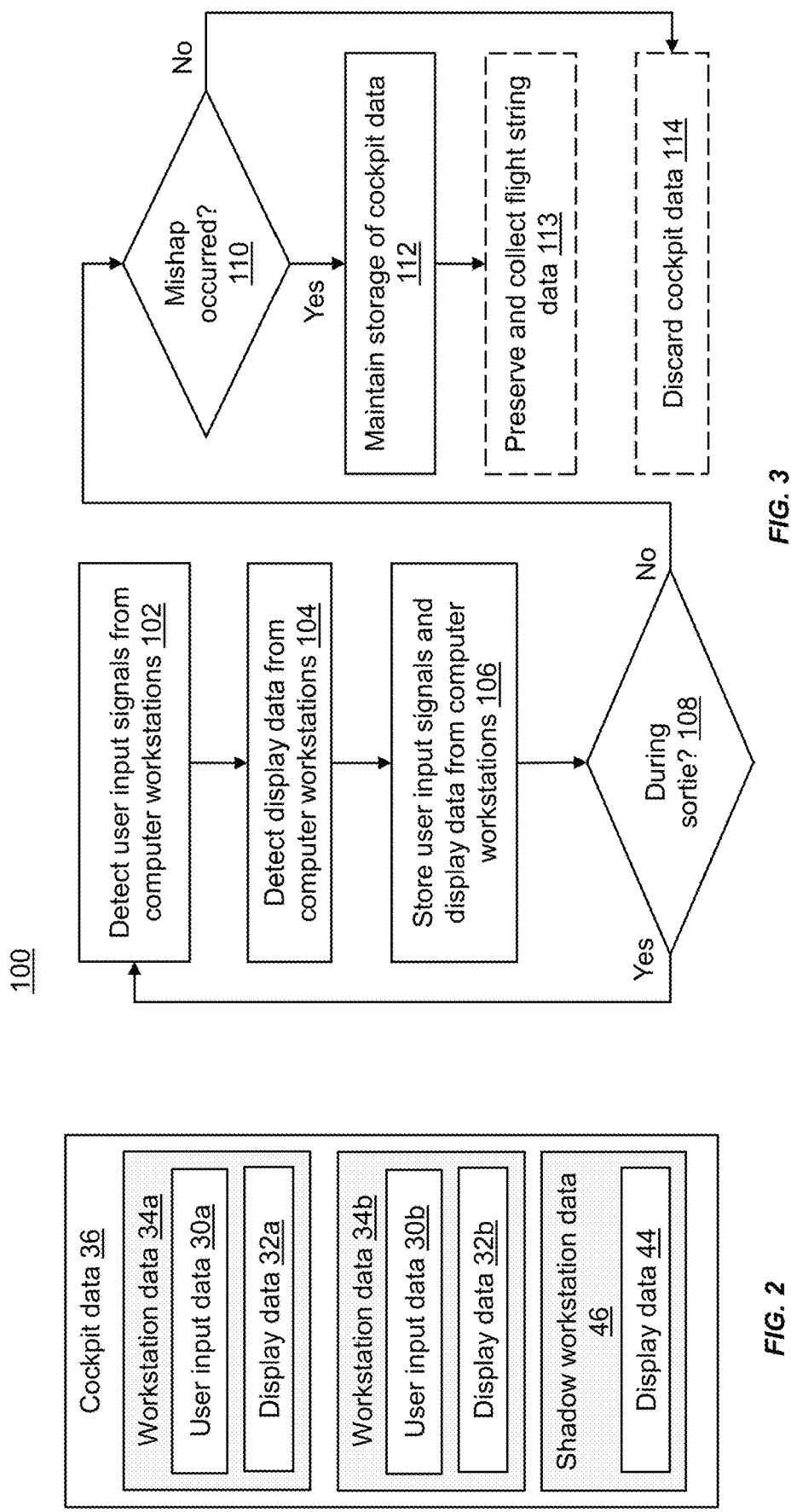

MISHAP LOGGING SYSTEM

GOVERNMENT LICENSE RIGHTS

This disclosure was made with Government support under contract number FA8620-15-D-3009, awarded by the Department of Defense. The Government has certain rights in the disclosure.

FIELD OF INVENTION

The present disclosure relates generally to mishap logging systems and more particularly to logging and maintaining data following a manned or unmanned system (e.g., aircraft, land, sea and/or space vehicle) mishap.

BACKGROUND

Manned aircraft contain flight data recorders and cockpit voice recorders (aka black boxes) for preserving data in case of a mishap (e.g., a crash). These black boxes contain voice and data recorders for recording hundreds of different statuses and inputs during a flight. If a mishap occurs, the National Transportation Safety Board (NTSB) recovers the black box and uses the data stored within to support an investigation to determine the cause of the mishap. In the case of an unmanned aircraft system, the remote control station portion of the unmanned aircraft system where the pilot controls the aircraft does not typically have aircraft data/voice recorders. This creates a critical data collection and information gap when investigating an unmanned aircraft system mishap.

SUMMARY

There are various forms of aircraft mishaps that range in seriousness from a catastrophic event resulting in a loss of aircraft or loss of life (e.g., crash) to less serious events that result in minor damage to property. Similar mishaps may occur in other manned or autonomous platforms such as autonomous cars, sea and space vehicles. Thus, while the methods and techniques described herein are well suited for use with unmanned aerial systems, it should be appreciated that these techniques are not limited in terms of their applicability to other systems including manned and autonomous vehicles whether on land, sea or space. For the sake of simplicity and ease of explanation, the below discussion will focus on aircraft mishap logging systems; however, as discussed above the same concepts are applicable to a wide variety of non-aerial systems and platforms.

Investigating a mishap involving an unmanned aircraft system is more complicated than performing the same analysis concerning a traditional manned aircraft. With unmanned aircraft the aircraft sometimes acts in an autonomous mode and other times is flown directly (or managed) by a remote control station sometimes located thousands of miles from the aircraft. The aircraft, data links, and control station all comprise the single unmanned aircraft system (UAS). Because of this, the cause of a mishap requires data/information from geographically separated UAS subsystems to be gathered and stitched together for analysis. For example, the ground station may direct a command to the aircraft to fly a specific navigation route when a mishap occurs. Determining the mishap cause requires data from both the aircraft and the control station to be available to the mishap investigation team.

While manned aircraft include black boxes for storing and protecting flight data, control stations providing command and control (C2) of unmanned aircraft do not have black boxes. Black boxes interface with avionics systems located within the aircraft and record key data. There are no comparable systems in unmanned aircraft, because the control stations often use commercial internet technology (IT) systems and data affecting the flight is stored in different physical locations.

The present disclosure provides a system and method for capturing and preserving mishap investigation data using commercial off the shelf (COTS) internet technology (IT) equipment in a way compliant with airworthiness certification requirements for unmanned aircraft systems.

In a general embodiment, the present disclosure provides a system and method for capturing and preserving data sent to/from computer workstations of a remote cockpit for an unmanned aircraft, cockpit data including user inputs and data displayed from the computer workstations, and aircraft C2 exchanged between the control station and aircraft.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages, and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

FIG. 2 is a block diagram of an exemplary embodiment of cockpit data.

FIG. 3 depicts an exemplary method for preserving a flight control string data for supporting mishap investigations of unmanned aircraft during a sortie.

Figure 1:
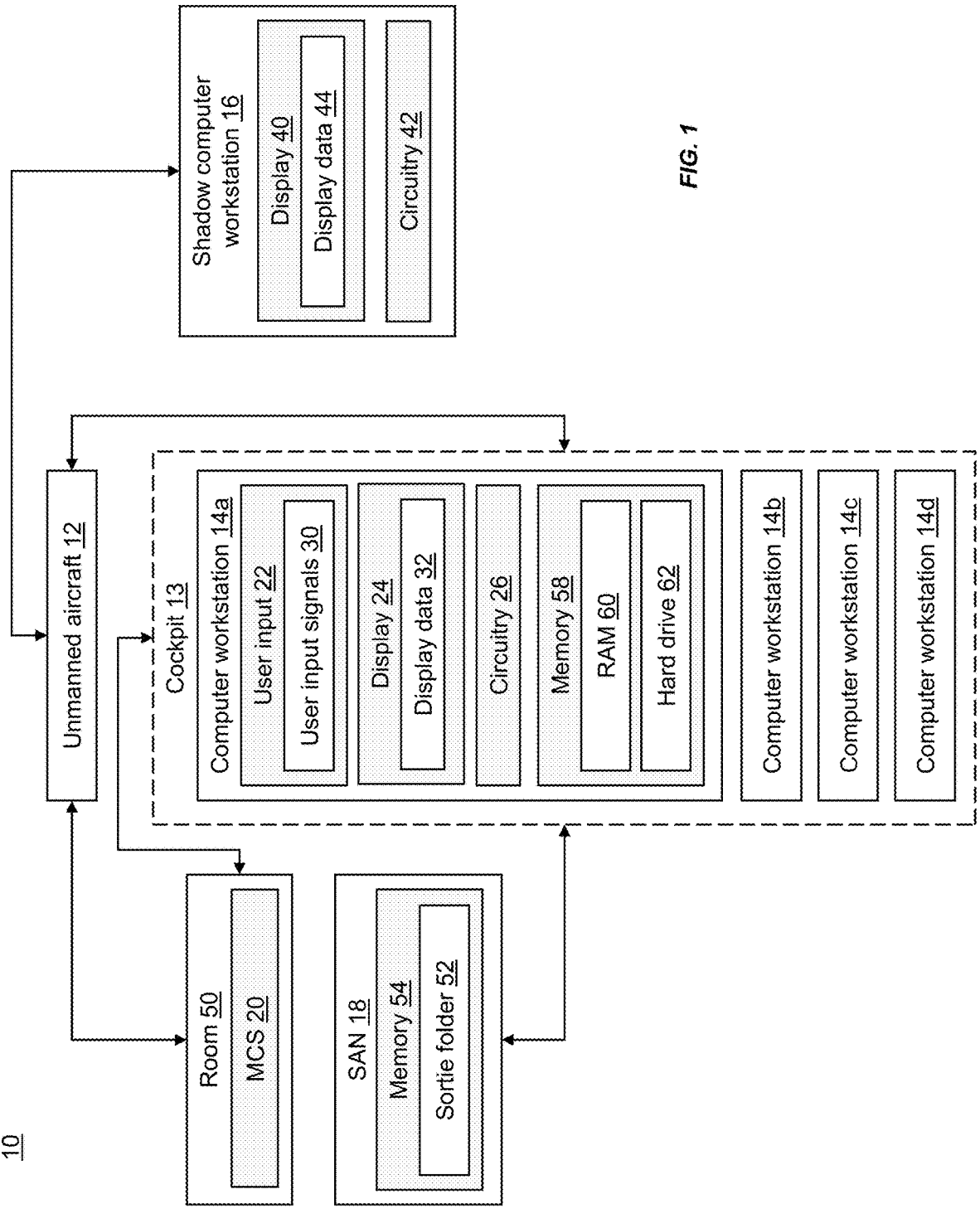
FIG. 1 is a block diagram of a system for preserving flight control string data for supporting mishap investigations of unmanned aircraft during a sortie.

The present disclosure is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

The present disclosure provides a system and method that captures cockpit data. The cockpit data includes user inputs (e.g., mouse inputs, keyboard inputs, etc.) and display outputs (i.e., data displaying to the user via displays). The cockpit data is captured and stored during a sortie (i.e., a flight) and the cockpit data is preserved (also referred to as impounded) when a mishap occurred during the sortie.

In the embodiment shown in FIG. 1, a system 10 is presented for preserving flight control string data to support mishap investigations of unmanned aircraft 12 during a sortie. The system 10 includes a cockpit 13 having computer workstations 14. The system 10 may additionally include a shadow computer workstation 16, a storage area network (SAN) 18, and a mission control system (MCS) 20. The computer workstations 14 each include a user input 22, a display 24, and circuitry 26. The circuitry 26 manages a flight of the unmanned aircraft 12 during the sortie. The circuitry 26 also detects (1) user input signals 30 received from the user input 22 during the sortie and (2) display data 32 that is output from the display 24 during the sortie. The circuitry 26 also causes workstation data 34 to be stored as cockpit data 36. The workstation data 34 includes the user input signals 30 and the display data 32 from each of the computer workstations 14a, 14b, 14c, and 14d of the cockpit 13. When a mishap occurs during the sortie, the circuitry 26 maintains storage of the cockpit data 36.

In one embodiment, the shadow computer workstation 16 monitors an aircraft sortie and includes a display 40 and circuitry 42. The circuitry 42 of the shadow computer workstation 16 is configured to detect display data 44 that is output from the display 40 of the shadow computer workstation 16 during the sortie. The circuitry 42 also causes shadow workstation data 46 to be stored as part of the cockpit data 36. The shadow workstation data 46 includes the display data 44 from the shadow computer workstation 16.

The system 10 may also include an MCS 20 that is communicatively coupled to the cockpit 13 and that is stored in a room 50.

As described above, the system 10 may also include a SAN 18. The SAN 18 stores the cockpit data 36 in a sortie folder 52 stored on a non-transitory computer readable medium (also referred to as memory) 54. When a mishap occurs during a sortie, the SAN 18 restricts access to the sortie folder 52 storing the cockpit data 36 for the sortie that the mishap is associated with.

The computer workstations 14 may additionally including memory 58 including random-access memory (RAM) 60 and non-transitory computer readable memory (also referred to as a hard drive) 62. When a mishap occurs during the sortie, the circuitry 26 of the computer workstation may capture a state of the RAM 60 and images of hard drives 62 of the computer workstations 14.

As described above, when a mishap occurs, storage of the cockpit data 36 is maintained and impounded as part of the mishap investigation. For example, the cockpit data 36 may be marked as read only to prevent editing or deletion of the cockpit data 36. The cockpit data 36 may also be moved to an archive for storage when a mishap occurs. Conversely, when a mishap does not occur, the circuitry 26 of the computer workstations 14 may cause the cockpit data 36 to be purged. For example, the cockpit data 36 may be deleted.

In the embodiment shown in FIG. 3, a method 100 is shown for preserving flight control string data to support mishap investigations of unmanned aircraft during a sortie. The method 100 may restrict both physical and logical (i.e., electronic) access to preserve the flight control string data. In process block 102, the circuitry 26 detects user input signals 30 received from the user input 22 of the computer workstation 14 during the sortie. In process block 104, the circuitry 26 detects display data 32 that is output from the display 24 of the computer workstation 14 during the sortie. In process block 106, the circuitry 26 causes cockpit data 36 including workstation data 34 from each of the computer workstations 14 of the cockpit 13 to be stored.

In decision block 108, a check is performed to determine if the sortie has finished (e.g., the plan has landed). If the sortie has not finished, then processing returns to process block 102. If the sortie has completed, then processing moves to decision block 110. In decision block 110, a check is performed to determine if a mishap occurred during the sortie. If a mishap occurred, then processing moves to process block 112 and storage of the cockpit data 36 is maintained. Following process block 112, the flight control string data may be preserved and collected in process block 113. Conversely, if a mishap has not occurred, then processing may move to process block 114 and the cockpit data 36 may be discarded.

In additional to the user inputs and display outputs, the cockpit data 36 may include messages sent to and received from the unmanned aircraft 12. For example, the cockpit data 36 may include data sent from the computer workstations 14 of the cockpit 13 to a backend server to a datalink with the aircraft 12.

Figure 4:
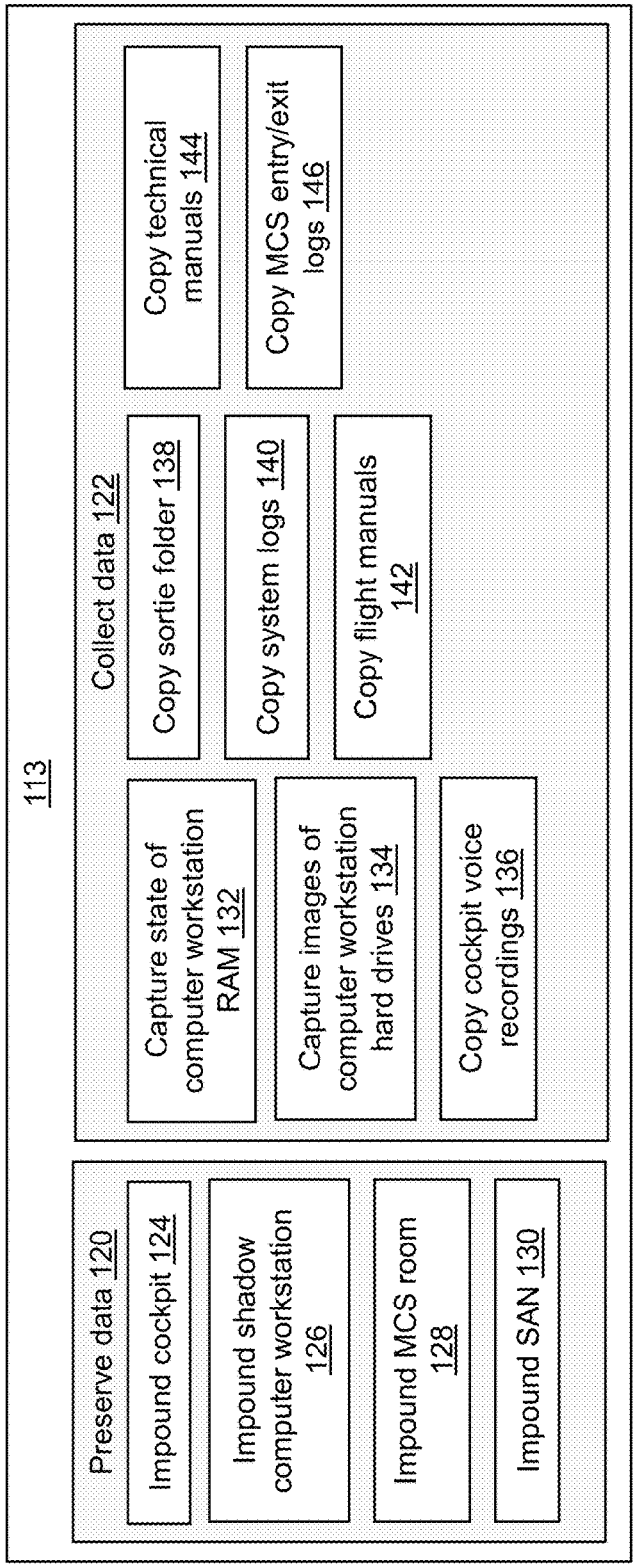
FIG. 4 is a block diagram of optional processes performed while preserving and collecting flight control string data.

In the embodiment shown in FIG. 4, optional processes performed in collecting and preserving the flight control string data 113 are shown. Preserving data 120 may include at least one of impounding the cockpit 124 (including the computer workstations 14 of the cockpit 13), impounding the shadow computer workstation(s) 126, impounding the MCS room 128, or impounding the SAN 130. Collecting data 122 may include at least one of capturing a state of computer workstation RAM 132, capturing images of computer workstation hard drives 134, copying video recordings from within the cockpit 136, copying the sortie folder 138, copying system logs 140, copying flight manuals 142 (e.g., that were accessed during the sortie), copying technical manuals 144 (e.g., that were accessed during the sortie), or copying MCS entry/exit logs 146 (e.g., identifying persons that entered and exited the room 50 of the MCS 20).

Impounding the cockpit 124 may include leaving each of the computer workstations 14 of the cockpit 13 powered on, disconnecting each of the computer workstations 14 of the cockpit 13 from a network (e.g., isolating the computer workstations 14 from wired and wireless communications from other computer devices), and restricting physical access to each of the computer workstations 14 of the cockpit 13.

Impounding the shadow computer workstation 126 may include leaving the shadow computer workstation 16 powered on, disconnecting the shadow computer workstation 16 from the network, and restricting physical access to the shadow computer workstation 16. Impounding the MCS room 128 may include restricting and documenting access to the room 50 of the MCS 20. Impounding the SAN 130 may include restricting access to the sortie folder 52.

Capturing a state of computer workstation RAM 132 may include copying contents of the RAM of the computer workstations to non-volatile memory (e.g., removable memory such as a USB drive). Similarly, capturing images of computer workstation hard drives 134 may include copying contents of the hard drives of the computer workstations to the removable memory.

Figure 5:
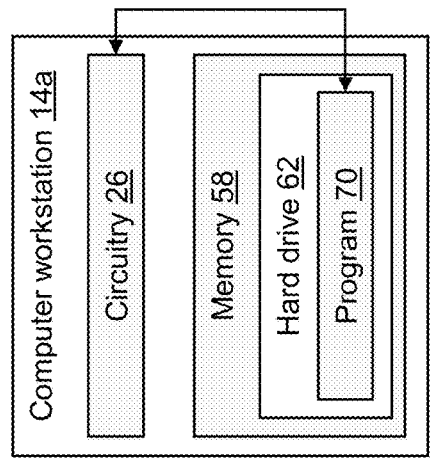
FIG. 5 is a block diagram of an exemplary embodiment of a computer program executed by a computer workstation of the system of FIG. 1.

As shown in the embodiment depicted in FIG. 5, the method 100 may be embodied as a computer program 70 program for preserving flight control string data to support mishap investigations of unmanned aircraft during a sortie. The computer program 70 is stored on a non-transitory computer readable medium and may be executed by the circuitry 26 of a computer workstation 14 of a cockpit 13 that manages a flight of the unmanned aircraft 12 during the sortie. When executed by a computer workstation 2614, the computer program 70 is configured to cause the circuitry 26 to perform the method 100 described above.

The computer program 70 may be embodied as computer executable code stored on a non-transitory computer readable medium. The computer program may be written using any suitable computer language.

The computer workstations 14 and shadow computer workstation 16 may be any suitable computer device suitable for performing the method 100 described herein. Similarly, the display 24, 40 may be any suitable display device for outputting visual content.

The SAN 18 may be embodied as one or more servers configured to receive and store data from the cockpit 13.

The cockpit may be one of multiple (e.g., two or ten) cockpits located in a mission control system (MCS). The MCS may be a server room that sends data to the cockpits and receives data from the cockpits.

In one embodiment, a cockpit 13 manages a flight of one unmanned aircraft (e.g., one aircraft per cockpit). The cockpit 13 may refer to a controlled access room including four operator positions (e.g., a pilot, a sensor operator, a spare (backup), and a monitor). Each operator position may include a computer workstation 14. The flight control string data may refer to all user inputs and display data for each operator position in the cockpit. The flight control string data may also include data from shadow workstations (i.e., workstations that were monitoring but not controlling the aircraft).

The unmanned aircraft 12 may be any remote controlled aircraft, such as a predator drone.

The circuitry 26, 42 may have various implementations. For example, the circuitry 26, 42 may include any suitable device, such as a processor (e.g., CPU), programmable circuit, integrated circuit, non-volatile memory and I/O circuits, an application specific integrated circuit, microcontroller, complex programmable logic device, other programmable circuits, or the like. The circuitry 26, 42 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the circuitry 26, 42. The circuitry 26, 42 may be communicatively coupled to the computer readable medium and network interface through a system bus, mother board, or using any other suitable structure known in the art.

As will be understood by one of ordinary skill in the art, the computer readable medium (memory) 54, 58 may be, for example, one or more of a buffer, a flash memory, a hard drive, a removable media, a volatile memory, a non-volatile memory, a random access memory (RAM), or other suitable device. In a typical arrangement, the computer readable medium 54, 58 may include a non-volatile memory for long term data storage and a volatile memory that functions as system memory for the processor 54, 58. The computer readable medium 54, 58 may exchange data with the circuitry over a data bus. Accompanying control lines and an address bus between the computer readable medium 54, 58 and the circuitry also may be present. The computer readable medium 54, 58 is considered a non-transitory computer readable medium.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method for preserving cockpit data to support mishap investigations of an unmanned vehicle during a sortie, the method comprising:
monitoring one or more computer workstations operatively coupled to the unmanned vehicle, each computer workstation including a user input and a display, wherein each of the computer workstations manages travel of the unmanned vehicle during the sortie, and wherein the monitoring of each of the computer workstations includes:
detecting, using circuitry, user input signals received from the user input of the computer workstation during the sortie; and
detecting, using the circuitry, display data that is output from the display of the computer workstation during the sortie;
causing, using the circuitry, workstation data from each of the computer workstations of the unmanned vehicle to be stored as part of the cockpit data, wherein the workstation data includes the user input signals and the display data from each of the computer workstations; and
when a mishap occurs during the sortie, maintaining storage of the cockpit data; and
wherein a shadow computer workstation includes a user input and a display to monitor the sortie, the method further comprising:
monitoring the shadow computer workstation during the sortie including detecting, using the circuitry, display data that is output from the display of the shadow computer workstation during the sortie; and
storing, using the circuitry of the shadow computer workstation, shadow workstation data as part of the cockpit data, wherein the shadow workstation data includes the display data from the shadow computer workstation.

2. The method of claim 1, wherein the unmanned vehicle is an unmanned aircraft and each of the computer workstations manages a flight of the unmanned aircraft during the sortie.

3. A method for preserving cockpit data to support mishap investigations of an unmanned vehicle during a sortie, the method comprising:
monitoring one or more computer workstations operatively coupled to the unmanned vehicle, each computer workstation including a user input and a display, wherein each of the computer workstations manages travel of the unmanned vehicle during the sortie, and wherein the monitoring of each of the computer workstations includes:
detecting, using circuitry, user input signals received from the user input of the computer workstation during the sortie; and
detecting, using the circuitry, display data that is output from the display of the computer workstation during the sortie;
causing, using the circuitry, workstation data from each of the computer workstations of the unmanned vehicle to be stored as part of the cockpit data, wherein the workstation data includes the user input signals and the display data from each of the computer workstations; and
when a mishap occurs during the sortie, maintaining storage of the cockpit data; and
when the mishap occurs during the sortie, impounding a shadow computer workstation including leaving the shadow computer workstation powered on, disconnecting the shadow computer workstation from the network, and restricting physical access to the shadow computer workstation.

4. The method of claim 3 further comprising, when the mishap occurs during the sortie, impounding a cockpit including leaving each of the computer workstations of the cockpit powered on, disconnecting each of the computer workstations of the cockpit from a network, and restricting physical access to each of the computer workstations of the cockpit.

5. The method of claim 3, further comprising, when the mishap occurs, capturing a state of random-access memory (RAM) of the computer workstations and capturing images of hard drives of the computer workstations.

6. The method of claim 3, further comprising, when the mishap occurs, copying the cockpit data to removable memory, wherein the removable memory is a non-transitory computer readable medium.

7. The method of claim 6, further comprising, when the mishap occurs, copying at least one of system logs, manuals, and technical manuals from the computer workstations of a cockpit to the removable memory.

8. The method of claim 3 wherein when the mishap does not occur, purging the cockpit data.

9. A method for preserving cockpit data to support mishap investigations of an unmanned vehicle during a sortie, the method comprising:
monitoring one or more computer workstations operatively coupled to the unmanned vehicle, each computer workstation including a user input and a display, wherein each of the computer workstations manages travel of the unmanned vehicle during the sortie, and wherein the monitoring of each of the computer workstations includes:
detecting, using circuitry, user input signals received from the user input of the computer workstation during the sortie; and
detecting, using the circuitry, display data that is output from the display of the computer workstation during the sortie;
causing, using the circuitry, workstation data from each of the computer workstations of the unmanned vehicle to be stored as part of the cockpit data, wherein the workstation data includes the user input signals and the display data from each of the computer workstations; and
when a mishap occurs during the sortie, maintaining storage of the cockpit data; and
wherein a cockpit is communicatively coupled to a mission control system (MCS) stored in a room and the method further comprises restricting and documenting access to the room of the MCS.

10. A method for preserving cockpit data to support mishap investigations of an unmanned vehicle during a sortie, the method comprising:
monitoring one or more computer workstations operatively coupled to the unmanned vehicle, each computer workstation including a user input and a display, wherein each of the computer workstations manages travel of the unmanned vehicle during the sortie, and wherein the monitoring of each of the computer workstations includes:
detecting, using circuitry, user input signals received from the user input of the computer workstation during the sortie; and
detecting, using the circuitry, display data that is output from the display of the computer workstation during the sortie;
causing, using the circuitry, workstation data from each of the computer workstations of the unmanned vehicle to be stored as part of the cockpit data, wherein the workstation data includes the user input signals and the display data from each of the computer workstations; and
when a mishap occurs during the sortie, maintaining storage of the cockpit data; and
wherein the cockpit data is stored in a sortie folder on a storage area network (SAN) and the method further comprises, when the mishap occurs, restricting access to the sortie folder.

11. A system for preserving cockpit data to support mishap investigations of an unmanned vehicle during a sortie, the system comprising:
computer workstations of a cockpit, each including a user input, a display, and circuitry configured to:
manage travel of the unmanned vehicle during the sortie;
detect user input signals received from the user input of the computer workstation during the sortie; and
detect display data that is output from the display of the computer workstation during the sortie;
cause workstation data to be stored as part of the cockpit data, wherein the workstation data includes the user input signals and the display data from each of the computer workstations of the cockpit; and
when a mishap occurs during the sortie, maintain storage of the cockpit data;
further comprising a shadow computer workstation including a display and circuitry configured to:
detect display data that is output from the display of the shadow computer workstation during the sortie;

cause shadow workstation data to be stored as part of the cockpit data, wherein the shadow workstation data includes the display data from the shadow computer workstation.

12. The system of claim 11, further comprising a mission control system (MCS) stored in a room and communicatively coupled to the cockpit.

13. The system of claim 11, further comprising a storage area network (SAN) configured to store the cockpit data in a sortie folder and, when the mishap occurs, restrict access to the sortie folder, wherein the SAN includes a non-transitory computer readable medium.

14. The system of claim 11, wherein the circuitry of the computer workstations is further configured, when the mishap occurs, to capture a state of random-access memory (RAM) of the computer workstations and to capture images of hard drives of the computer workstations.

15. The system of claim 11:
wherein the circuitry of the computer workstations is further configured to, when the mishap does not occur, purge the cockpit data.

16. The system of claim 11, wherein the unmanned vehicle is an unmanned aircraft and the circuitry of the computer workstations manages a flight of the unmanned aircraft during the sortie.

17. A non-transitory computer readable medium, which will execute a computer program for preserving cockpit data to support mishap investigations of an unmanned vehicle during a sortie, that when executed by circuitry of a computer workstation of a cockpit that manages travel of the unmanned vehicle during the sortie, is configured to cause the circuitry to:

detect user input signals received from a user input of the computer workstation during the sortie;

detect display data that is output from a display of the computer workstation during the sortie;

cause workstation data to be stored as part of the cockpit data, wherein the workstation data includes the user input signals and the display data; and when a mishap occurs during the sortie, maintain storage of the cockpit data;

wherein the computer program is configured to cause the circuitry to maintain storage of the cockpit data on a storage area network (SAN), store the cockpit data in a sortie folder, and restrict access to the sortie folder when the mishap occurs; wherein the SAN includes a non-transitory computer readable medium.

18. The non-transitory computer readable medium of claim 17, wherein, when the mishap occurs, the computer program is further configured to cause the circuitry to capture a state of random-access memory (RAM) of the computer workstation and to capture images of a hard drive of the computer workstation.

19. The non-transitory computer readable medium of claim 17:
wherein, when the mishap does not occur, the computer program is further configured to cause the circuitry to purge the cockpit data.

20. The non-transitory computer readable medium of claim 17, wherein the unmanned vehicle is an unmanned aircraft and the computer program manages a flight of the unmanned aircraft during the sortie.

* * * * *